(12) United States Patent
Liang et al.

(10) Patent No.: US 9,609,331 B2
(45) Date of Patent: *Mar. 28, 2017

(54) CAMERA PARAMETER-ASSISTED VIDEO FRAME RATE UP CONVERSION

(71) Applicant: QUALCOMM Incorporated, San Diego, CA (US)

(72) Inventors: Liang Liang, San Diego, CA (US); Bob R. Hung, Carlsbad, CA (US); Gokce Dane, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,944

(22) Filed: Aug. 21, 2015

(65) Prior Publication Data
US 2015/0365675 A1 Dec. 17, 2015

Related U.S. Application Data

(63) Continuation of application No. 13/115,888, filed on May 25, 2011, now Pat. No. 9,137,569.
(Continued)

(51) Int. Cl.
*H04N 7/01* (2006.01)
*H04N 21/435* (2011.01)
(Continued)

(52) U.S. Cl.
CPC .......... *H04N 19/132* (2014.11); *H04N 5/772* (2013.01); *H04N 7/0127* (2013.01);
(Continued)

(58) Field of Classification Search
CPC ............. H04N 5/23203; H04N 21/235; H04N 21/435; H04N 5/0733; H04N 5/23206;
(Continued)

(56) References Cited

U.S. PATENT DOCUMENTS 6,833,865 B1  12/2004  Fuller et al.
8,203,592 B2 *  6/2012  Nelson ..................... H04N 7/15
                                                      348/14.01
(Continued)

FOREIGN PATENT DOCUMENTS

JP  2004221744 A  8/2004
JP  2005223814 A  8/2005
(Continued)

OTHER PUBLICATIONS

Hideaki Kimata et al: "Usage and description of camera parameters f o r Multi-view Video Coding and Free-viewpoint TV", 1. AVC Meeting; Nov. 13, 1990-Nov. 16, 1990; The Hague (CCITT SGXVExpert Group for ATM Video ~Oding), XX, XX, No. M12239, Jul. 15, 2005 (Jul. 15, 2005), XP030040924.
(Continued)

*Primary Examiner* — Hung Lam
(74) *Attorney, Agent, or Firm* — Knobbe, Martens, Olson & Bear, LLP

(57) ABSTRACT

This disclosure describes methods and apparatus for decoding data. In one aspect, the method comprises decoding encoded video data to obtain decoded video frame data, the encoded video data comprising encoded video frame data encoded at a first frame rate and embedded data. The method further comprises determining a camera parameter from the embedded data and up-converting the decoded video frame data to a second frame rate based on the camera parameter. The determined camera parameter may be, for example, a parameter associated with one or more of a zoom factor, an auto focus status, lens position information, frame luma information, an auto exposure (AE) convergence status, an automatic white balance (AWB) convergence status, global motion information, and frame blurriness information, and the like. An encoding device may embed the camera param-
(Continued)

eter(s) in an encoded video bit stream for a decoder to utilize during frame rate up-conversion.

28 Claims, 13 Drawing Sheets

Related U.S. Application Data

(60) Provisional application No. 61/348,400, filed on May 26, 2010.

(51) Int. Cl.

| | | |
|---|---|---|
| *H04N 19/132* | (2014.01) | |
| *H04N 5/77* | (2006.01) | |
| *H04N 21/235* | (2011.01) | |
| *H04N 21/4223* | (2011.01) | |
| *H04N 21/4402* | (2011.01) | |
| *H04N 21/6332* | (2011.01) | |
| *H04N 21/654* | (2011.01) | |
| *H04N 21/8405* | (2011.01) | |
| *H04N 19/105* | (2014.01) | |
| *H04N 19/139* | (2014.01) | |
| *H04N 19/46* | (2014.01) | |
| *H04N 19/51* | (2014.01) | |
| *H04N 19/513* | (2014.01) | |
| *H04N 19/196* | (2014.01) | |
| *H04N 19/61* | (2014.01) | |
| *H04N 19/463* | (2014.01) | |
| *H04N 19/587* | (2014.01) | |
| *H04N 19/59* | (2014.01) | |
| *H04N 19/179* | (2014.01) | |
| *H04N 5/765* | (2006.01) | |

(52) U.S. Cl.
CPC ......... *H04N 19/105* (2014.11); *H04N 19/139* (2014.11); *H04N 19/179* (2014.11); *H04N 19/196* (2014.11); *H04N 19/46* (2014.11); *H04N 19/463* (2014.11); *H04N 19/51* (2014.11); *H04N 19/513* (2014.11); *H04N 19/587* (2014.11); *H04N 19/59* (2014.11); *H04N 19/61* (2014.11); *H04N 21/235* (2013.01); *H04N 21/2353* (2013.01); *H04N 21/4223* (2013.01); *H04N 21/435* (2013.01); *H04N 21/440281* (2013.01); *H04N 21/6332* (2013.01); *H04N 21/654* (2013.01); *H04N 21/8405* (2013.01); *H04N 5/765* (2013.01)

(58) Field of Classification Search
CPC ....... H04N 19/00545; H04N 19/00551; H04N 19/00684; H04N 19/00733; H04N 19/00751; H04N 19/00757; H04N 19/00781; H04N 21/4223
USPC ....... 348/207.1, 211.1, 222.1, 240.99, 387.1, 348/440.1, FOR. 160
See application file for complete search history.

(56) References Cited

U.S. PATENT DOCUMENTS

| | | | |
|---|---|---|---|
| 8,471,890 B1* | 6/2013 | Golas | H04N 7/15 |
| | | | 348/14.08 |
| 8,570,438 B2 | 10/2013 | Bhaskaran et al. | |
| 9,357,141 B2* | 5/2016 | Overton | H04N 7/181 |
| 2002/0071037 A1 | 6/2002 | Haavisto | |
| 2005/0114887 A1 | 5/2005 | Gelissen | |
| 2006/0002465 A1 | 1/2006 | Raveendran et al. | |
| 2006/0146144 A1 | 7/2006 | Salmelin et al. | |
| 2007/0074117 A1 | 3/2007 | Tian et al. | |
| 2007/0230563 A1 | 10/2007 | Tian et al. | |
| 2008/0107361 A1 | 5/2008 | Asukai et al. | |
| 2008/0181298 A1 | 7/2008 | Shi et al. | |
| 2009/0290698 A1* | 11/2009 | Lundgren | H04M 3/42034 |
| | | | 379/142.04 |
| 2010/0253846 A1 | 10/2010 | Fergason et al. | |
| 2010/0309975 A1 | 12/2010 | Zhou et al. | |
| 2010/0309987 A1 | 12/2010 | Concion et al. | |
| 2011/0294544 A1 | 12/2011 | Liang et al. | |
| 2012/0321273 A1 | 12/2012 | Messmer | |

FOREIGN PATENT DOCUMENTS

| | | |
|---|---|---|
| JP | 2006115336 A | 4/2006 |
| JP | 2007082186 A | 3/2007 |
| JP | 2008041134 A | 2/2008 |
| JP | 2009088878 A | 4/2009 |
| JP | 2009200985 A | 9/2009 |
| JP | 2009302786 A | 12/2009 |
| JP | 2010263520 A | 11/2010 |
| KR | 101329860 B1 | 11/2013 |
| WO | WO-2006007527 A2 | 1/2006 |
| WO | WO-2007115126 | 10/2007 |

OTHER PUBLICATIONS

Imaizumi H et al: "Description of Metadata by using OCI-Descriptor for MPEG4 Ver.2", 1. AVC Meeting; Nov. 13, 1990-Nov. 16, 1990; The Hague ; (CCITT SGXVExpert Group for ATM Video Coding), XX, XX, No. M3949, Oct. 6, 1998 (Oct. 6, 1998), XP030033207.

International Search Report and Written Opinion—PCT/US2011/037976, International Search Authority—European Patent Office—Sep. 26, 2011.

Kim et al., "Global Motion-Compensated Preprocessing Algorithm for Block-Based Frame-Rate Conversion", Journal of Electronic Imaging, vol. 19, Issue 2, Apr. 2010, 10 pages.

Written Opinion of the International Preliminary Examining Authority issued in corresponding International Application No. PCT/US2011/037976 on Jun. 5, 2012.

Yen-Kuang Chen et al: "Frame-rate up-conversion using transmitted true motion vectors" Multimedia Signal Processing, 1998 IEEE Second Workshop on Redondo Beach, CA, USA Dec. 7-9, 1998, Piscataway, NJ, USA,IEEE, us, Dec. 7, 1998 (Dec. 7, 1998), pp. 622-627, XP010318331, DOI : 10.1109/MMSP. 1998.739050 ISBN: 978-0-7803-4919-3.

* cited by examiner

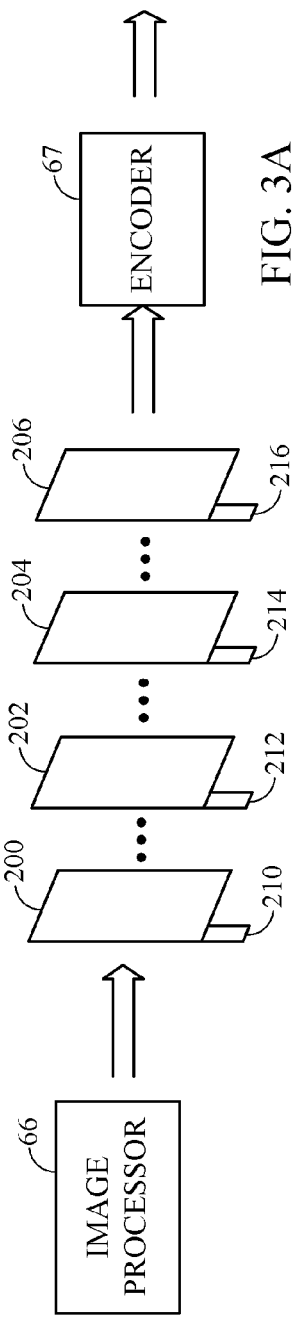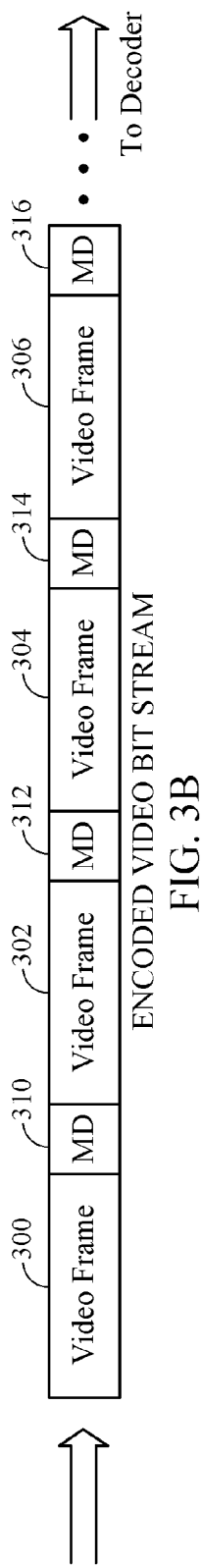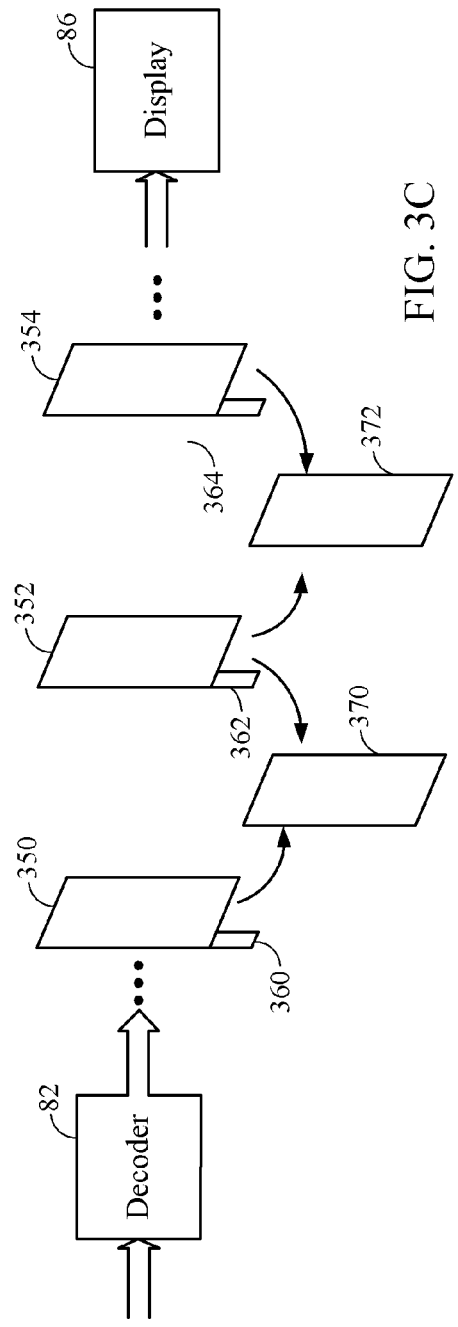

CAMERA PARAMETER-ASSISTED VIDEO FRAME RATE UP CONVERSION

CROSS REFERENCE TO RELATED APPLICATIONS

This application claims priority to and is a continuation of U.S. application Ser. No. 13/115,888, filed on May 25, 2011 and entitled "CAMERA PARAMETER-ASSISTED VIDEO FRAME RATE UP CONVERSION," which claims priority under 35 U.S.C. §119 to U.S. Provisional App. No. 61/348,400, filed on May 26, 2010, and entitled "CAMERA PARAMETER-ASSISTED VIDEO FRAME RATE UP CONVERSION." The entire contents of each of the above-referenced applications are considered part of this application, and are hereby incorporated by reference in their entirety.

TECHNICAL FIELD

The disclosure relates to video encoding and decoding. More specifically, this disclosure relates to obtaining one or more video capture parameters and using those parameters to control a video decoding process.

BACKGROUND

Decoder side frame rate up-conversion has been studied, and many algorithms have been proposed. In some prior art frame rate up-conversion algorithms, motion vectors of the interpolated frames are predicted (e.g., using motion vector processing or using new motion estimation) from neighboring frames decoded using video data transmitted by the video encoding device. A commonly used strategy is to compute new interpolated motion vectors for the missing or the to-be-interpolated frame based on motion vector information from the neighboring frames to achieve smooth video content transition. Another method is to perform a new motion estimation algorithm that aims to provide more accurate motion vectors. In cases where the predicted motion vectors of the interpolated frame yield inaccurate results, the average pixel values between neighboring decoded frames may be used for the inserted frames.

FIG. 1 illustrates a conventional prior art frame rate up-conversion technique. In this example, a video decoding device may receive a video stream of encoded video frames. The video decoding device may decode the encoded video stream and output decoded video frames that include the sequence shown in FIG. 1. The sequence may include decoded frames 102 and 104 as reference frames for an interpolated frame 100. Using conventional techniques for frame rate up-conversion, an interpolated frame 100 may be predicted using motion vectors from directly neighboring frames 102, directly before and after the interpolated frame 100, or more distant frames 104 as illustrated in FIG. 1. The frames utilized to predict the interpolated frame 100 may be utilized for motion vector prediction of the interpolated frames. For example, the reference frames could be N neighboring decoded frames (N=1, 2, . . . ). However, determining the motion vectors for prediction of the interpolated frame 100 according to conventional techniques may be computationally complex and inaccurate.

SUMMARY

According to one aspect, a method for encoding video data is disclosed. The method includes obtaining at least one video frame from a camera, obtaining at least one camera parameter, encoding the at least one video frame to form an encoded frame, and embedding the camera parameters in the encoded frame such that a decoder can read the embedded parameters and frame rate up-convert the video data.

According to another aspect, an electronic device is disclosed. The device includes means for obtaining at least one video frame from a camera, means for obtaining at least one camera parameter, means for encoding the at least one video frame to form an encoded frame, and means for embedding the at least one camera parameter in the encoded frame such that a decoder can read the embedded parameters and frame rate up-convert the video data.

According to another aspect, an electronic device is disclosed. The device includes a video capture device configured to obtain at least one video frame from a camera, a processor configured to obtain at least one camera parameter, and an encoder configured to encode the at least one video frame to form an encoded frame and embed the camera parameters in the encoded frame such that a decoder can read the embedded parameters and frame rate up-convert the video data.

According to another aspect, a non-transitory computer-readable medium having stored thereon code that when executed performs a method is disclosed. The method includes obtaining at least one video frame from a camera, obtaining at least one camera parameter, encoding the at least one video frame to form an encoded frame, and embedding the camera parameters in the encoded frame such that a decoder can read the embedded parameters and frame rate up-convert the video data.

According to another aspect, a method for decoding video data is disclosed. The method includes receiving a bit stream including video data and embedded data, obtaining at least one camera parameter from the embedded data, and up converting a video frame rate based on the at least one camera parameter.

According to another aspect, a device is disclosed. The device includes means for receiving a bit stream including video data and embedded data, means for obtaining at least one camera parameter from the embedded data, and means for up converting a video frame rate based on the at least one camera parameter.

According to another aspect, a device is disclosed. The device includes a decoder configured to receive a bit stream including video data and embedded data and obtain at least one camera parameter from the embedded data, and a processor configured to up convert a video frame rate based on the at least one camera parameter.

According to another aspect, a non-transitory computer-readable medium having stored thereon code that when executed performs a method is disclosed. The method includes receiving a bit stream including video data and embedded data, obtaining at least one camera parameter from the embedded data, and up converting a video frame rate based on the at least one camera parameter.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 3A-3C illustrate an overall system structure in accordance with aspects of this disclosure.

DETAILED DESCRIPTION

Figure 1:
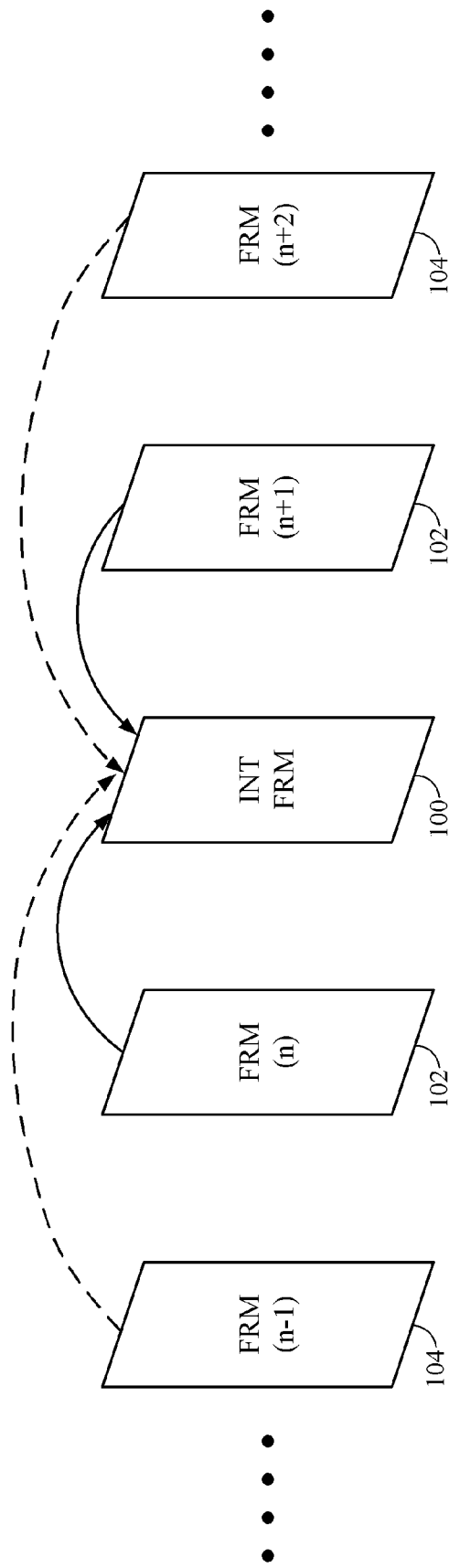
FIG. 1 illustrates a conventional frame rate up-conversion technique.

This disclosure describes techniques for utilizing one or more parameters associated with a video capture device to control video decoding functionalities such as, for example, frame rate up-conversion. Using parameters associated with a video capture device, a video decoding device may promote video quality while reducing computational complexity in the video decoding device.

The parameters associated with the video capture device may be obtained by the video capture device such as a video camera, during the capturing of video frames. The video capture device may include a video encoding device configured to embed the parameters during encoding of the video frames. A video decoding device may utilize one or more of the parameters to decode the video frames. In this manner, the video decoder may utilize information related to the camera at the time of capture to decode the frames, thereby reducing computational complexity associated with decoding functions. For example, the decoder may utilize the information to reduce the computational complexity during a frame rate up-conversion process.

One embodiment relates to techniques for obtaining one or more video capture parameters associated with a video capture device and using the obtained video capture parameters to control a video decoding process. The obtained video capture parameters may be, for example, parameters associated with auto exposure control (AE), auto focus (AF), auto white balance (AWB), zooming, motion in captured frames, and the like. The video encoding device may encode, e.g., packetize the video capture parameters as metadata that also contains information regarding the determinations made based on the video capture parameters. This video capture parameter metadata obtained at the source, encoder side can then be transmitted to the destination, decoder side. The destination may include a device configured to display the video data.

In some video systems, frame rate up-conversion may be utilized to accommodate display rates that are different from video capture rates. Frame rate up-conversion may be performed at the encoder side or the decoder side. Performing frame rate up-conversion on the decoder side may be more effective as encoded video may be transmitted to systems that require different frame rates, and therefore, different amount of up-conversion. Techniques for frame rate up-conversion aim to add frames into a video stream without adding artifacts that may result from simply repeating a frame. Therefore, frame rate up-conversion techniques create a frame that provides a smooth transition between the two original frames that precede and follow the created frame.

The computation of interpolated motion vectors is complex and becomes especially difficult and inaccurate when the video stream contains digital and/or optical zoom, auto focus refocusing, scene changes, abrupt brightness changes, change in white balance, and the like. Thus, interpolating the inserted frames with good spatial-temporal quality could involve high computation complexity with less accuracy in video streams that involve changes of parameters during the capturing of the video data. These changes may include, for example, zoom, brightness, focus, and the like. Without previous knowledge of this front end video information, the computation of the inserted frames can become time-consuming and inefficient due to the computation complexity associated with compensating for the changes during capture of the video data. Additionally, conventional approaches implement frame rate up-conversion utilizing motion vectors or mode information without considering video front end information, which may vary from one system to another.

Embodiments described herein include systems and processes that utilize parameters obtained by a video capture device to assist a video decoding device perform more efficient frame rate up-conversion and video playback. By using such a system, the video decoding device may achieve a more efficient and accurate motion vector prediction of the inserted frames. The video capture device may obtain the parameters while capturing video frames. After capture, the video processing device may packetize the obtained parameters and information related to the parameters as metadata. The packetized parameters may be attached to the corresponding frame for transmission to the video decoding device to assist in the frame rate up-conversion process. By reading the video capture parameters included in the metadata, the video decoding device may use that data to make early decisions on how to predict the motion vectors of inserted interpolated frames. The metadata may also be useful to more accurately compute the interpolated motion vectors as the metadata consists of camera-specific information, as will be discussed in more detail below. Using the techniques of this disclosure may significantly reduce computation complexity for frame rate up-conversion and enhance accuracy and quality of the interpolated frames. Examples of video capture device information that can be included into metadata can include the amount of zoom, auto focus and refocus settings, change in brightness, auto exposure control, change in white balance, scene change detection, and motion in frames as detected by motion sensors, and the like.

Figure 2:
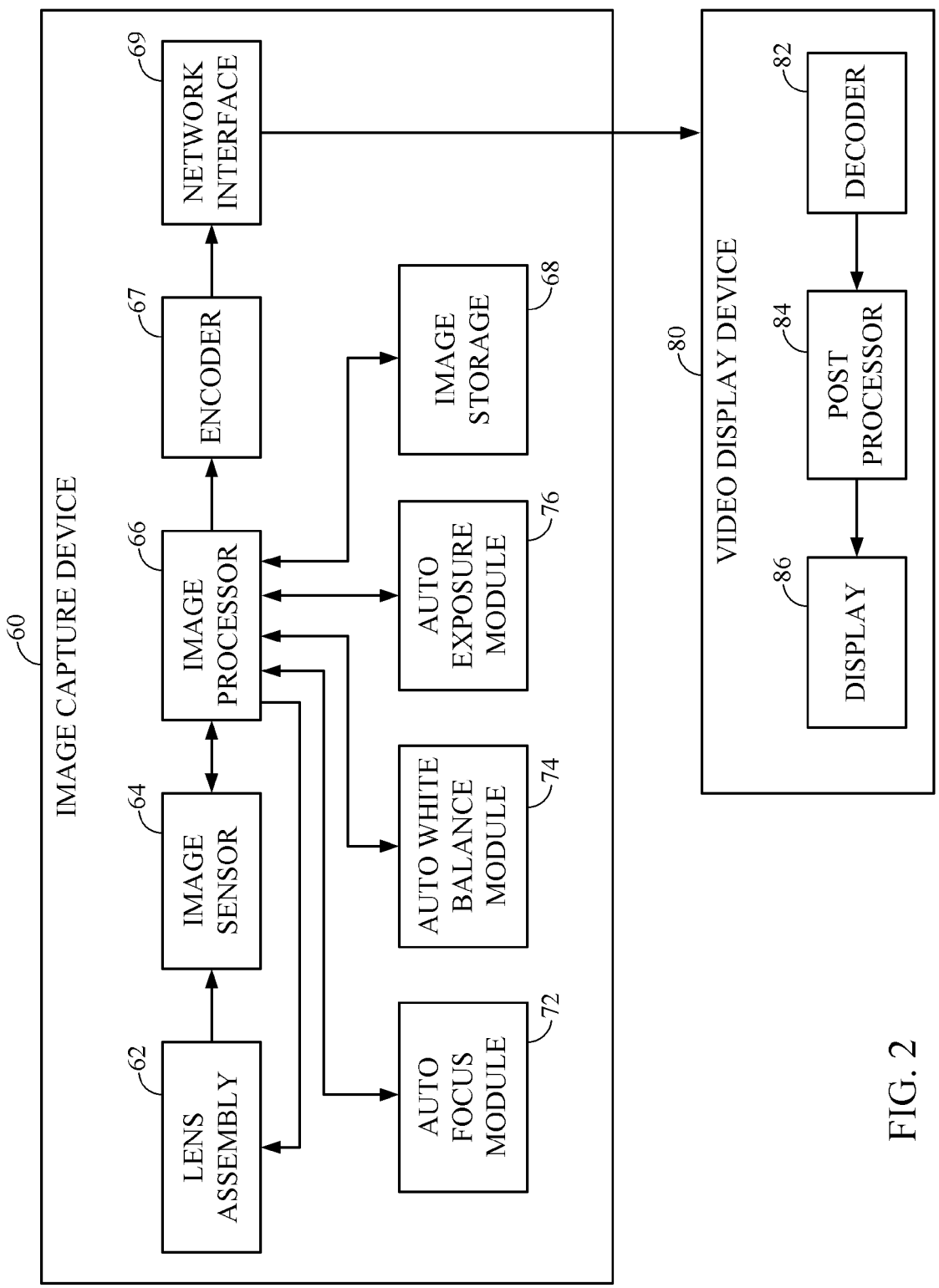
FIG. 2 is a block diagram illustrating a video capture device.

FIG. 2 is a block diagram illustrating an example image capture device 60. Image capture device 60 may comprise lens assembly 62, image sensor 64, image processor 66, image storage 68, encoder 67 and network interface 69. Additionally, the image capture device 60 may include modules for adjusting parameters and several modules such as, for example, auto focus (AF) module 72, auto white balance (AWB) module 74, and auto exposure (AE) module 76. According to some aspects, image processor 66 may be a video front end (VFE) image processor, or the like.

Aspects of this disclosure may be utilized in any of a variety of recording, encoding, decoding, and playback devices. For purposes of this discussion, a video camera is used as an example image capture device 60. However, it should be understood that aspects of this disclosure may be implemented by a variety of devices and systems that have an image or video capture component and an image or video encoding component, among other components. For example, the device for capturing the video data and for displaying the video data as described herein may include an electronic camera, video recorder, a web camera, a camera built into a portable or mobile computer, including but not limited to, a cellular telephone, smart phone, portable media player, personal digital assistant, a laptop, or a tablet computer. The image capture device 60 may be a digital camera, such as a digital video camera, a digital still image camera, or a combination of both. Image capture device 60 may be a stand-alone device, such as a stand-alone camera, or be integrated in another multi-purpose device, such as a wireless communication device. Image capture device 60 may be equipped to capture color imagery, black-and-white imagery, or both. In some aspects, image capture device 60 may also include a microphone to capture audio. In this disclosure, the term "image," or similar terms may interchangeably refer to either video or still pictures.

Lens assembly 62 may include one or more lenses and may be controlled by lens actuators that move the lenses within a housing of the lens assembly 62 among a plurality of different lens positions to focus the lenses for capturing a scene. Image sensor 64 may include image sensor elements such as, for example, a charge coupled device (CCD) array or other image sensing device that receives light via the lens and generates image data in response to the received image. Image sensor 64 obtains image information for the scene that image capture device 60 is capturing. In one example, image sensor 64 may provide information regarding motion in a captured video stream. Image processor 66 processes the image information and stores the image information in image storage 68. Image sensor 64 may also obtain image information for the scene being captured for use in functions such as, AF, AWB, and AE functions. Image processor 66 utilizes the image information for preliminary processing for the AF, AWB, and AE functions.

In one example, the image processor 66 may control the AF module 72 to initiate an auto focus process based on the image information from image sensor 64. During video recording, changes within a scene that a video capture device is capturing may trigger the AF function to refocus. The AF function may involve calculating focus values at several lens positions and selecting a lens position with the maximum focus value for a current scene, which may correspond to a maximum image sharpness value. AF module 72 may determine image sharpness based on analysis of pixel contrast values within the image information obtained by image sensor 64. AF module 72 may provide an indication when a frame is being captured during a refocus process. During the refocus process, AF module 72 may provide information associated with a captured frame such as, for example, the focus value and the lens position. In one example, when the refocus process is triggered, AF module 72 may keep track of the lens position at the beginning of the refocus process and the lens position when refocus is achieved.

In one example, image information for calibrating the image sensor 64 may be obtained by the image processor 66. The information may include AWB and AE data, which may indicate information regarding environmental color, illumination, and luminance characteristics. AWB module 74 may obtain and analyze raw image information obtained by image sensor 64. AWB module 74 may output an indication of the environment of the scene based on the analyzed image information. For example, if the image information indicates illuminant color characteristics and/or intensities consistent with an indoor environment, AWB module 74 may output an indication of an indoor environment. In one example, AWB module 74 may output a grey world decision for each captured frame. The AWB grey world decision may be based on grey world assumption, which states that, in a given image, the average values of the RGB components of the image should average to a common grey value. Based on the determined grey value, AWB module 74 may classify the image into a category or a cluster. For example, in a given system, there may be three grey world categories or clusters: an outdoor cluster, an indoor cluster, and a horizon cluster. The clusters may be organized based on color temperature within the frame. AWB module 74 may indicate the category or cluster associated with each captured frame.

AE module 76 may obtain and analyze the raw image information obtained by image sensor 64. The AE module 76 may evaluate the brightness level of the captured frame using luminance values of the captured frame, and output an indication of the brightness level of the scene based on the analyzed image information. In some examples, AE module 76 may express brightness level in Lux, discussed in more detail below. The raw image information may include, for example, raw luma values for the pixels in a captured frame. AE module 76 may utilize the luma values to provide statistics of luma values within the frame, as described in more detail below. AE module 76 may also provide with a captured frame information regarding brightness in the frame such as, the average frame luma and an exposure index associated with the frame, discussed in more detail below.

The video stream captured by image capture device 60 may include raw video data and camera parameters, which may be used to determine characteristics of the captured video frames (e.g., zooming, brightness level, auto focus refocus, motion, white balance, and the like) when interpreted by a video processing device (e.g., video encoding device).

The captured video stream, along with the camera parameters may be sent to the encoder 67 configured to encode the video stream as will be described in greater detail with reference to FIGS. 3A-3B. The encoded video data may then be sent to a network interface 69 which is configured to transmit the encoded video data to another device in a communication network.

The network interface 69 may include an antenna and a transceiver (not shown) so that the image capture device 60 can communicate with one or more devices over a communication network. The network interface 69 also may have some processing capabilities for performing additional processing of the encoded video data. An antenna (not shown) connected to the network interface 69 can transmit and receive signals. In some implementations, the antenna transmits and receives RF signals according to the IEEE 16.11 standard, including IEEE 16.11(a), (b), or (g), or the IEEE 802.11 standard, including IEEE 802.11a, b, g or n. In some other implementations, the antenna transmits and receives RF signals according to the BLUETOOTH standard. In the case of a cellular telephone, the antenna may be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), NEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. A transceiver (not shown) of the network interface 69 can pre-process the signals received from the antenna so that they may be received by and further manipulated by the video capture device. For example, the transceiver can process feedback signals received from a video display device 80.

The video display device 80 may be configured to communicate with the image capture device 60. For example, the video display device 80 may receive an encoded bit stream from the image capture device 60. The encoded bit stream may be decoded by a decoder 82 of the video display device 80. The decoder 82 generates decoded video frames and extracts embedded camera parameters from the received bit stream. The decoded video frames may then be processed by a post-processor 84. The post-processor 84 may be configured to process the decoded video frames and perform operations such as up-converting the video frame rate of the video data. Additionally, the post-processor 84 may adjust various parameters of the decoded video frames based on the obtained camera parameters. The processed video data is then displayed by a display 86 of the video display device 80.

FIGS. 3A-3C illustrate an example overall system structure in accordance with aspects of this disclosure. The image processor 66 (e.g., VFE) may process the frames captured by the video capture device and packetize information related to AF, AWB, AE, zooming, and motion into metadata and attach the metadata 210, 212, 214, and 216 to the corresponding video frames 200, 202, 204, and 206, respectively to send to the encoder 67 for encoding. As discussed above, the metadata 210, 212, 214, and 216 may contain information related to the raw data and camera parameters and/or statistics obtained by the image capture device 60. The encoder 67 encodes the video frames 200, 202, 204, and 206 along with the corresponding metadata 210, 212, 214, and 216 to generate an encoded bit stream as illustrated in FIG. 3B. The encoded bit stream may include encoded video frame information 300, 302, 304, and 306 along with embedded metadata 310, 312, 314, and 316 embedded at the end of the corresponding encoded video frames. One of ordinary skill in the art will recognize that the embedded metadata 310, 312, 314, and 316 may be embedded at the beginning of a corresponding encoded video frame. Additionally, or alternatively, the metadata may be embedded at the beginning of each corresponding encoded video frame, or within the encoded video frame information. The encoded video stream may be transmitted to other devices for decoding, storage and/or display.

With reference to FIG. 3C, a decoder 82 may utilize the metadata 210, 212, 214, and 216 for decoder side frame rate up-conversion, which may result in less complex computations and more accurate results for an interpolated frame than a conventional system.

As illustrated in FIG. 3C, the video decoding device decodes the encoded video stream it receives, which yield the decoded video frames 350, 352, and 354 and their corresponding attached metadata 360, 362, and 364. The video display device may utilize the metadata 360, 362, and 364 and the decoded video frames 350, 352, and 354 during the frame rate up-conversion process to generate the interpolated frames 370 and 372. The up-converted video stream is then sent to a display 86.

In one example, the metadata attached to a corresponding frame may contain VFE information such as, for example, zooming, auto focus status, lens position, AE convergence status, frame luma, AWB convergence status, global motion information, frame blurriness information, and the like. The metadata may be utilized to assist in decoder-side frame rate up-conversion to reduce computational complexity. Additionally, the metadata may be also utilized in the encoding process to make encoding decisions, which may additionally reduce data rate and computational complexity. The table below illustrates example contents of metadata attached to a corresponding frame:

TABLE 1

| 3A Meta Data Content |
| --- |
| Zooming Information |
| Auto Focus Status, Lens Position |
| AEC Convergence Flag, Frame Luma |
| AWB Convergence Flag |
| Global Motion information |
| Frame Blurriness Level |
| . . . |

Figure 4:
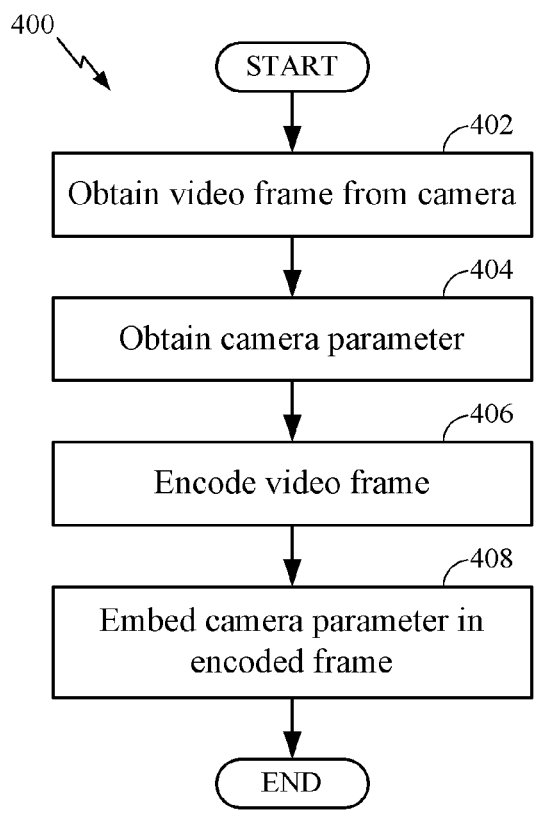
FIG. 4 illustrates a flowchart of a method of encoding video data in accordance with aspects of the this disclosure

FIG. 4 illustrates a flowchart of an example method of encoding video data in accordance with aspects of the disclosure. As illustrated in FIG. 4, the method 400 may begin by obtaining the video frame from a camera at block 402. The method proceeds by obtaining a camera parameter at block 404. The camera parameter may correspond to the settings of the camera at the time of capturing the corresponding video frame. At block 406, a video frame is encoded, and at block 408 the camera parameter is embedded in the encoded video frame. For example, as described above with reference to FIG. 3, the camera parameter may be packetized and attached as metadata to the video frame, and the video frame and the attached metadata may be encoded to generate an encoded bit stream.

Figure 5:
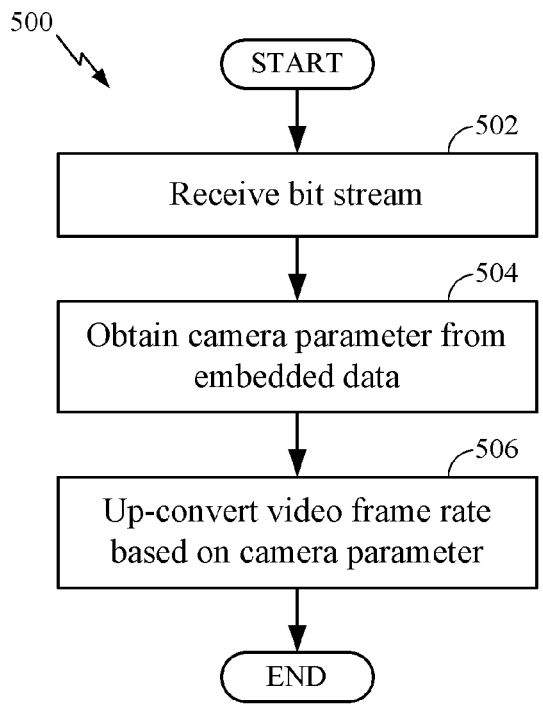
FIG. 5 illustrates a flowchart of a frame rate up-conversion method in accordance with aspects of this disclosure.

FIG. 5 illustrates a flowchart of an example frame rate up-conversion method in accordance with aspects of this disclosure. As illustrated in FIG. 5, the method 500 may begin by receiving a bit stream at block 502. For example, the bit stream may correspond to encoded video data which includes embedded camera parameters. At block 504, the method 500 may obtain a camera parameter from the embedded data. The method may extract metadata which is encoded along with the video frames and obtain camera parameters by decoding the metadata. For example, the method may decode the encoded frames and de-packetize the embedded metadata. At block 506, the method may up-convert the frame rate based on the obtained camera parameter.

The method of up-converting a video frame rate based on particular camera parameters will now be described with reference to FIGS. 6-10 below. As discussed above, the camera parameters which may be included in the encoded bit stream can include camera zoom information.

Digital zooming in/out is a process of up-scaling/down-scaling image content with the field of view change. Optical zooming in/out involves receiving real information by the sensor where real optical resolution may zoom in/out of the objects of focus. In both, digital and optical zooming, zooming in/out changes the field of view in a frame. At the time zooming occurs, a zooming factor may be available and attached by the image processor 66 to the corresponding frames. For example, if zooming in occurs in frame 350 by factor K, zooming information attached to frame 350 may indicate the zooming in factor. The video decoding device may receive zooming information with the video stream, and may use zooming information to simplify the frame rate up-conversion process for the corresponding frames and interpolation of the inserted frames as illustrated in FIGS. 6A-6B.

The video decoding device may utilize the zooming factor and other zooming information to derive the motion vectors for the interpolated frame. In one example, the video encoding device may perform motion-compensated prediction for the frame rate up-conversion process. In another example, the decoding device may interpolate the interpolated frame using up-scaling or down-scaling, based on whether zooming in or out occurred, without using motion vector-based prediction.

Figure 6A:
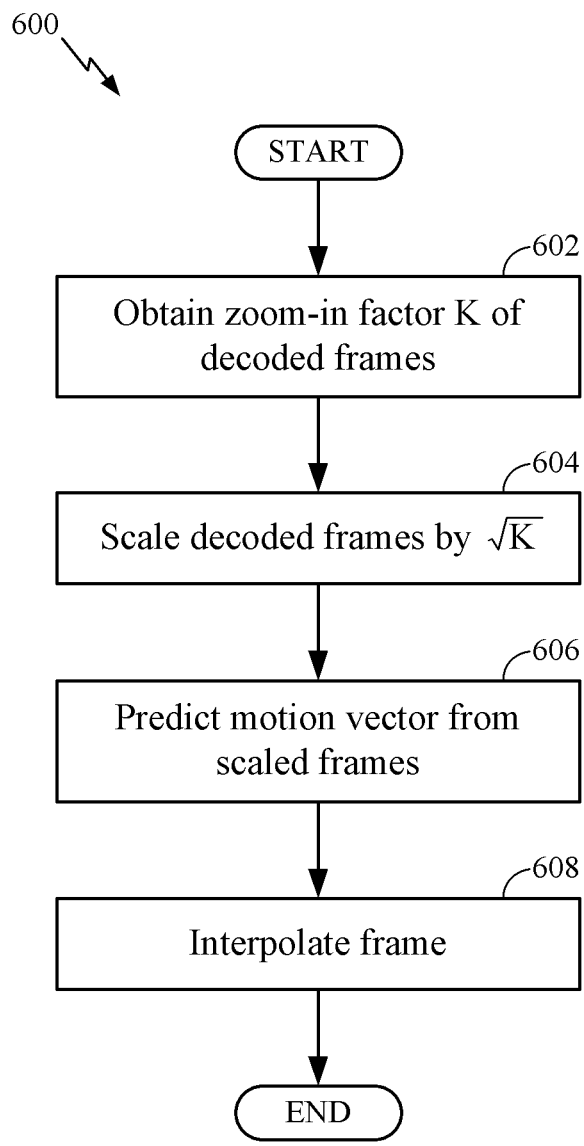
FIG. 6A illustrates a flowchart of a frame rate up-conversion method based on zoom information in accordance with aspects of this disclosure.
Figure 6B:
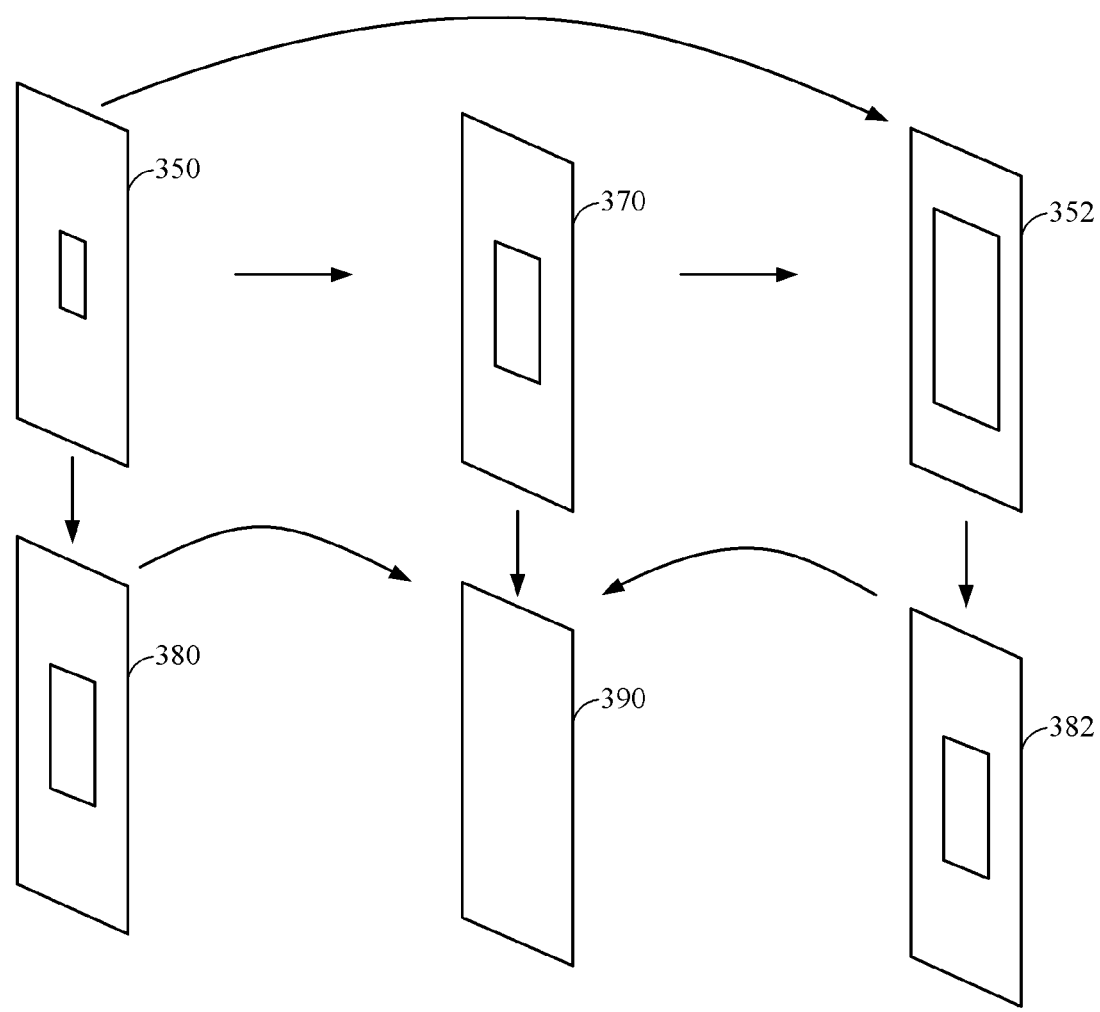
FIG. 6B illustrates an example use of zoom information for frame rate up-conversion in accordance with aspects of this disclosure.

FIG. 6A illustrates a flowchart of an example frame rate up-conversion method based on zoom information in accordance with aspects of this disclosure. FIG. 6B illustrates an example use of zoom information for frame rate up-conversion in accordance with aspects of this disclosure. As illustrated in FIG. 6A, the method 600 may begin by obtaining a zoom-in factor K of the decoded frames at block 602. With reference to FIG. 6B, in one example of this disclosure, zooming in may have occurred during video capture, where the image capture device 60 captured frame 350, then zooms in by a factor K and captures frame 352. The factor K associated with the zooming in may be attached to frame 350 and/or frame 352. Frames 350 and 352 may be directly adjacent frames in the decoded video stream or may be distant frames based on the interpolation method.

The method may continue by scaling the decoded frames by a factor of SQRT(K) at block 604. For example, at the video decoding device side, the zooming in factor K may be available in the metadata associated with decoded frames 350 and 352. During frame rate up-conversion, the video decoding device may up-scale frame 350 by a factor of SQRT(K), and may down-scale frame 352 by a factor of SQRT(K), as illustrated in FIG. 6B. The resulting up-scaled frame 380 and down-scaled frame 382 may then have the same amount of zoom as each other. The zoom of frames 380 and 382 may correspond to an adjusted zoom which is at a level between that of frame 350 and frame 352. The adjusted zoom corresponds to the amount of zoom that the inserted interpolated frame 370 should have.

In order to display a smooth image, the interpolated frame 370 may be generated as a zoomed in version of frame 350, and a zoomed out version of frame 352, where the zoom in factor and the zoom out factor have the same value, which is SQRT(K). As a result, a smooth visual transition between the two frames 350 and 352 can be achieved.

The method may then proceed to predict motion vectors from the scaled frames at block 606. Using the up-scaled and down-scaled versions of frames 350 and 352, respectively, simplifies motion vector prediction. In one example, there may be no motion occurring from frame 350 to frame 352, and the up-scaled frame 350 or the down-scaled frame 352 may be used directly as the inserted frame 370. In another example, there may be motion occurring from frame 350 to frame 352, and motion vector prediction for motion vectors 390 corresponding to the interpolated frame 370 may be performed using motion vector prediction from both the up-scaled frame 350 and the down-scaled frame 352. By up-scaling frame 350 and down-scaling frame 352, the motion vector prediction may be simplified because two frames with the same amount of zoom are compared instead of frame with two different zoom factors. Based on the predicted motion vectors, a frame may then be interpolated to up-convert the video frame rate as illustrated by block 608.

According to some embodiments, the camera parameters embedded to the encoded video frames may include auto focus and blurriness level. During video capture, as objects in field of view of the image capture device 60 change and move, the focus in a captured frame changes, and the continuous auto focus functionality refocuses by adjusting the lens position to achieve the best amount of focus. During the refocusing process, the captured image content may become blurry as the lens positions changes in search for the best lens position that provides the best focus. The blurriness level in the frames captured during the refocus process may vary depending on the amount of change in the lens position. In some cases, depending on the amount of blur in the content of a captured frame, the video decoding device may simplify interpolation during the frame rate up-conversion using the auto focus and lens position information included in the metadata corresponding to a frame. The auto focus refocusing status and the blurriness level of the corresponding frame may be obtained and determined by an image processor and transmitted to the video decoding device via the metadata attached to the corresponding frame.

Figure 7:
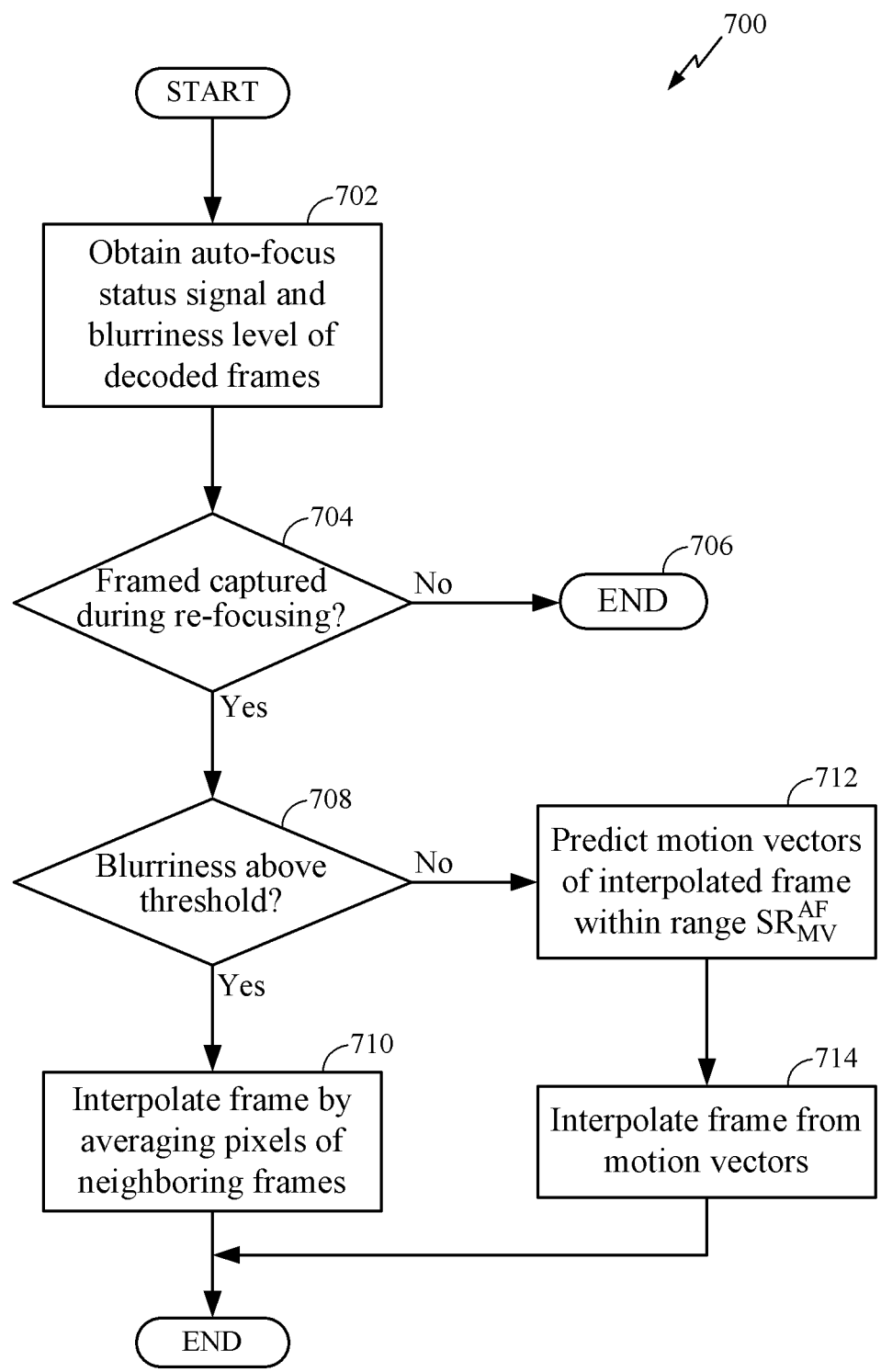
FIG. 7 illustrates a flowchart of a frame rate up-conversion method based on auto-focus and blurriness information in accordance with aspects of this disclosure.

FIG. 7 illustrates a flowchart of an example frame rate up-conversion method based on auto-focus and blurriness information in accordance with aspects of this disclosure. The method 700, may include obtaining an auto focus status signal and blurriness level of decoded frames at block 702. Based on the received auto focus signal and blurriness level of a decoded frame, the video decoding device may predict an interpolated frame by determining whether the received auto focus status signals that the current decoded frames were captured during a refocusing process as illustrated by decision block 704. If the frames were not captured during a re-focusing operation, the method of up converting the video frame rate based on blurriness information ends at block 706. If the auto focus signal indicates that the frame was captured during re-focusing, the method proceeds to decision block 708. At decision block 708, the method determines whether the blurriness level is above a predefined threshold. For example, the method may determine the result of Equation 1 below.

$$\frac{(BlurrinessLevel_{frame(n)} + BlurrinessLevel_{frame(n+1)})}{2} > Th_{AF} \qquad \text{Eq. (1)}$$

where $Th_{AF}$ may be defined by the user, predefined by the system, or automatically adjusted by the system. As shown in Equation 1, the blurriness level of the interpolated frame is generated by averaging the co-located pixel values of the neighboring two decoded frames. If the blurriness level is above the predetermined threshold $Th_{AF}$, the method may then interpolate a frame by averaging pixels of neighboring decoded frames as illustrated in block 710.

If the blurriness level is below the predefined threshold $Th_{AF}$, the motion vectors of the interpolated frames can be predicted with a different motion vector searching range $(SR_{MV}^{AF})$ at a block 712. The motion vector search range $(SR_{MV}^{AF})$ is a reduced search range compared to the motion vector searching range $(SR_{MV})$ used in the normal motion vector estimation/prediction mode. The reduced motion vector search range $(SR_{MV}^{AF})$ may be determined according to Equation 2 below.

$$q \propto \frac{(BlurrinessLevel_{frame(n)} + BlurrinessLevel_{frame(n+1)})}{2} \quad \text{Eq. (2)}$$

$$SR_{MV}^{AF} = \frac{SR_{MV}}{p}, \; p = \text{function}(q)$$

where q is proportional to the amount of blurriness in the frames preceding and following the interpolated frame, and p is a function of q, and may be user-defined. Therefore, as blurriness increases, q increases. Based on the predicted motion vectors, an interpolated frame may then be generated for up-converting the frame rate as illustrated in block 714.

In one example, the image processor 66 may evaluate blurriness during the continuous auto focus refocusing process. An initial blurriness level (B0) may be estimated based on the percentage of the focus value (FV) change after FV drops, compared to the original FV value ($FV_0$), which represents the focus value before refocusing was initiated. For example, initial blurriness level (B0) may be determined according to Equation 3 below:

$$B_0 = \frac{|FV_1 - FV_0|}{FV_0} \quad \text{Eq. (3)}$$

wherein $FV_1$ corresponds to the focus value at time T=1.

Once the refocus is triggered, the searching direction is determined by finding the direction of lens position change that causes the FV to increase. Once the searching direction is determined, the lens is adjusted step by step to achieve the best focus position. The blurriness during this process is evaluated according to Equation 4 below:

$$B_i = K \frac{G_i}{FV_i} \quad \text{Eq. (4)}$$

$$\begin{cases} \text{if } B_i < 0, & B_i = 0 \\ \text{if } B_i > 1, & B_i = 1 \end{cases}$$

$$B_i \in [0, 1] \; i = 1, 2, \ldots$$

where K is an adjustable constant and the default value is: K=$FV_1$, Gi is the absolute value of the gradienc and is calculated based on Equation 5 below:

$$G_i = \left| \frac{FV_i - FV_{i-1}}{LensP_i - LensP_{i-1}} \right| \quad \text{Eq. (5)}$$

where $LensP_i$ is the lens position corresponding to $FV_i$.

Once a peak value ($FV_N$) is found, the refocus process terminates and the blurriness is reset to zero.

According to some embodiments, the camera parameters may also include brightness information. The auto exposure control (AEC) function of the image processor 66 may adjust the image sensor 64 through operation of the AE module 76 to achieve a desired brightness level within a desired range. As the brightness in a scene the image capture device 60 is recording changes, an auto exposure (AE) convergence function may readjust the brightness level back to the tolerance range of a target luma corresponding to the desired brightness level range. In some image capture devices, an AEC slow convergence technique may be used to re-adjust the brightness level in captured frames. The brightness readjustment process may be slow, taking for example up to 2-3 seconds, but it provides a smooth transition in brightness change. The slow convergence technique may include two stages: holding time control and convergence process. During holding time control, the brightness level may change abruptly, but the sensor-driven brightness readjustment process has not started. During the convergence process, the frame luma value is re-adjusted gradually based on the exposure step size determined based on the corresponding brightness level changes. Brightness level changes may be considered a scene change (depending on the level of change). The video decoding device may utilize information related to brightness it receives to adjust the frame rate up-conversion process.

For example, if brightness change is above certain amount, and therefore, a scene change may have occurred, the video decoding device may skip interpolation as the two frames neighboring an inserted frame would be from two different scenes. In another example, the video decoding device may change the motion estimation method from pixel-based search to a frequency domain method which is more resistant to brightness changes.

In one example, AEC convergence status, the convergence stage flags (flags on holding time control and convergence process), as well as the frame luma values, may be transmitted to the video decoding device side in the metadata attached to the corresponding frame. In the example of holding time control, there is no brightness level readjustment, but instead, an abrupt change in frame luma. In this example, interpolation of the inserted frame may be simplified using intermediate reference frames, which have the same brightness level. In the example of the convergence process, the brightness change from frame to frame is smooth but the intermediate reference frames are also needed for motion vector interpolation of the inserted frames. In either example, the intermediate frames may have the same brightness levels to obtain more accurate prediction that takes out the brightness factor.

Figure 8A:
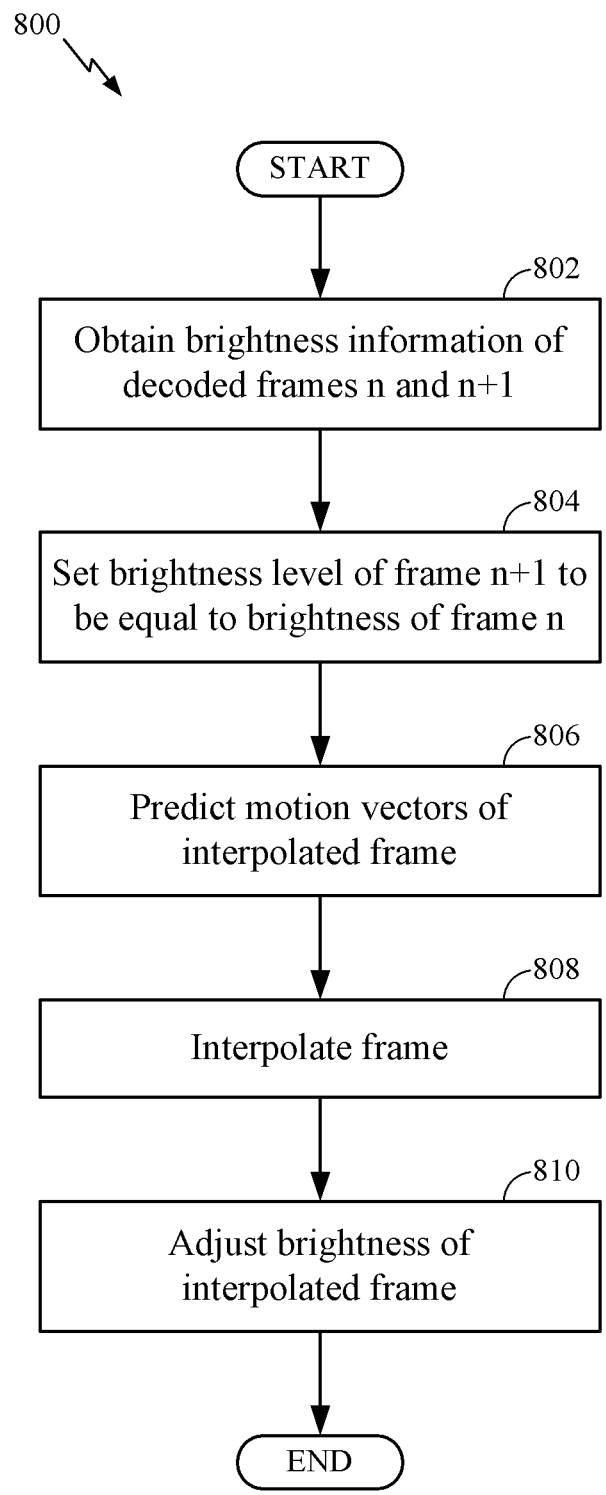
FIG. 8A illustrates a flowchart of an example frame rate up-conversion method based on brightness information in accordance with aspects of this disclosure.
Figure 8B:
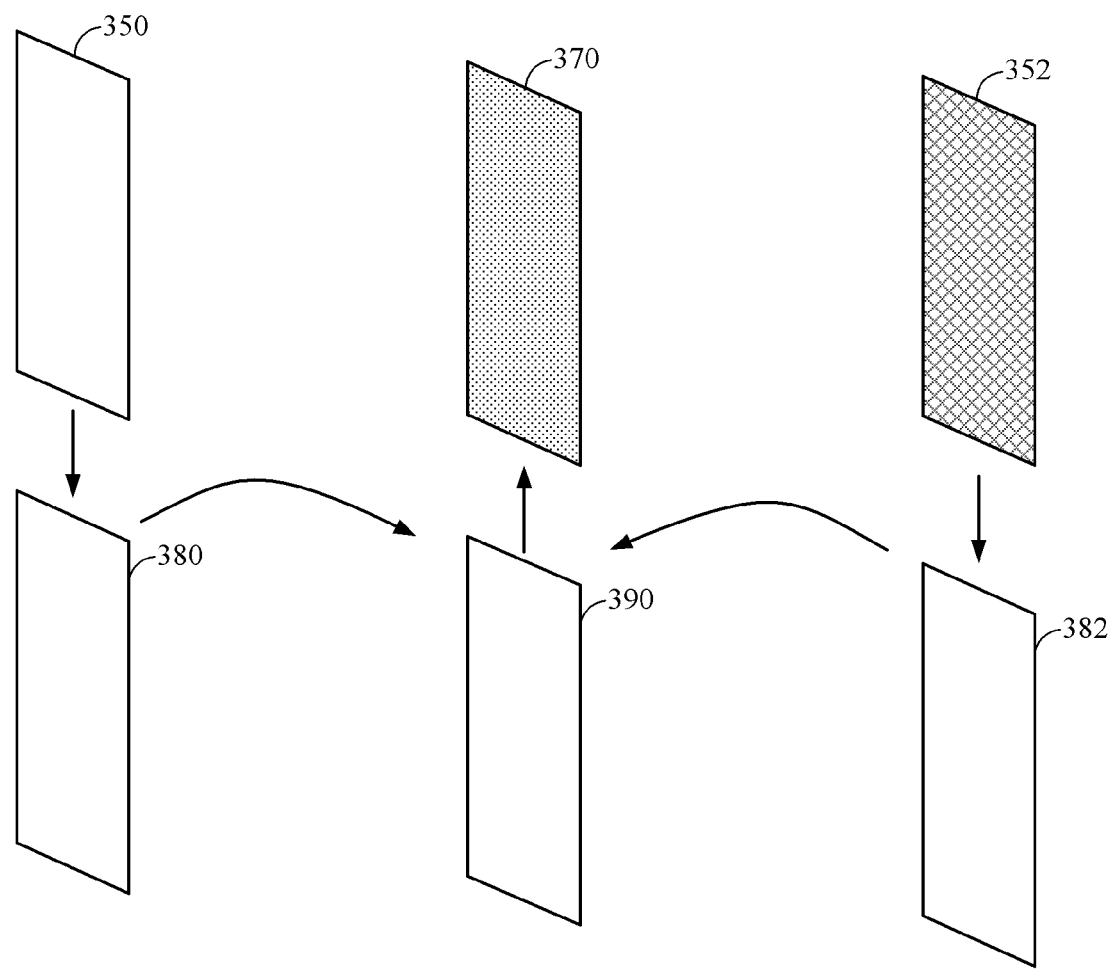
FIG. 8B illustrates example use of brightness information for frame rate up-conversion in accordance with aspects of this disclosure.

FIG. 8A illustrates a flowchart of an example frame rate up-conversion method based on brightness information in accordance with aspects of this disclosure. FIG. 8B illustrates example use of brightness information for frame rate up-conversion in accordance with aspects of this disclosure. As illustrated in FIG. 8A, a method 800 includes obtaining brightness information of decoded frames n and n+1 in the video frame sequence at block 802.

At block 804, the brightness level of frame n+1 is set equal to the brightness level of frame n. This operation is further illustrated in FIG. 8B. By knowing the frame luma values of the decoded frames during the convergence process, one of the neighboring frames 380 and 382 of the interpolated frame 370 is recovered to be at the same brightness level as that of the previous frame 350 or the next frame 352 of the decoded video stream. For example, as illustrated in FIG. 8B, the brightness level of the next frame 352 is increased to generate the neighboring frame 382 such that the brightness of frame 382 matches the brightness of frame 380.

With returned reference to FIG. 8A, at block 806, a prediction of motion vectors for the interpolated frame is calculated, and a video frame rate is up converted by interpolating a frame based on the predicted motion vectors at block 808. With the reference frames at the same brightness level, the motion vector prediction of the interpolated frame may be performed and may achieve a more accurate result compared to the case without any knowledge on the AEC convergence information.

For example, with reference to FIG. 8B, based on the neighboring frames 380 and 382, the pixel values of the intermediate frame 380 may be determined. According to some embodiments, the pixel values of this intermediate frame 390 may be obtained using the following Equation 6:

$$PixelValue_{frame(n+1)'} = \frac{PixelValue_{frame(n+1)} \times FrameLuma_{frame(n)}}{FrameLuma_{frame(n+1)}} \quad \text{Eq. (6)}$$

The average frame luma value of the final interpolated frame 370 may be described according to Equation 7 below:

$$FrameLuma_{InterpFrame} = \frac{}{1 + \frac{(FrameLuma_{frame(n+1)} - FrameLuma_{frame(n)})}{2 \times FrameLuma_{frame(n)}}} \quad \text{Eq. (7)}$$

At block 810, the brightness of the interpolated frame is adjusted. For example, the final interpolated frame 370 is obtained by re-adjusting each pixel value according to Equation 8 below, where $PixelValue_{InterpFrame'}$ is the pixel values in the interpolated frame obtained from the same brightness level reference frames $$PixelValue_{InterpFrame} = \frac{PixelValue_{InterpFrame'} \times FrameLuma_{frame(n)}}{FrameLuma_{InterpFrame}} \quad \text{Eq. (8)}$$

Another camera parameter which may be included in the encoded bit stream corresponds to o auto white balance (AWB) and color gain information. When there is light temperature change in a captured scene, the AWB slow convergence of an image capture device 60 strives to converge to the new light temperature by re-adjusting R/G and B/G gains. The AWB mode emphasizes the stability and transition smoothness. The color jitter should be suppressed as much as possible. The same principles apply for a frame rate up-conversion process. In order to convey a smooth color transition between the two decoded frames that precede and follow the inserted frame, color jitter should be suppressed as much as possible. The AWB convergence process adjusts R/G and B/G gains for each frame according to the following equation:

New gain=Old gain*w+Current gain*(1−w)  Eq. (9)

where W corresponds to a predefined convergence gain value. For example, W may be set equal to 0.025 for a QCamcorder AWB convergence setting. W may be re-adjusted based on user preference. "New gain" may correspond to the white balance gain applied to the image processor 66. "Old gain" may correspond to the white balance gain of the previous frame, and "Current gain" may correspond to the white balance gain for the current frame.

In one aspect of this disclosure, the video decoding device may adjust the color gain of the interpolated frame in frame rate up-conversion and preserve smooth color transition. The AWB convergence status and the differences of the R/G and B/G gains between the decoded previous frame and the current frame are transmitted to the video decoding device side via the metadata. The differences in color gain may be described according to Equations 10 below:

$$\Delta\left(\frac{R}{G}\right)^{frame(n+1)}_{frame(n)} = \left(\frac{R}{G}\right)_{frame(n+1)} - \left(\frac{R}{G}\right)_{frame(n)} \quad \text{Eq. (10)}$$

$$\Delta\left(\frac{B}{G}\right)^{frame(n+1)}_{frame(n)} = \left(\frac{B}{G}\right)_{frame(n+1)} - \left(\frac{B}{G}\right)_{frame(n)}$$

In one aspect of this disclosure, motion vector interpolation of the inserted frame relies primarily on luminance domain interpolation. However, after luma domain motion vector prediction is performed, the R/G and B/G gains can be re-adjusted for the interpolated frame to achieve a smooth visual color transition. The R/G and B/G gain of the inserted frame may be adjusted according to Equation 11 below:

$$\left(\frac{R}{G}\right)_{frame(interp)} = \left(\frac{R}{G}\right)_{frame(n)}\left(1 + \frac{1}{2}\Delta\left(\frac{R}{G}\right)^{frame(n+1)}_{frame(n)}\right) \quad \text{Eq. (11)}$$

$$\left(\frac{B}{G}\right)_{frame(interp)} = \left(\frac{B}{G}\right)_{frame(n)}\left(1 + \frac{1}{2}\Delta\left(\frac{B}{G}\right)^{frame(n+1)}_{frame(n)}\right)$$

Figure 9A:
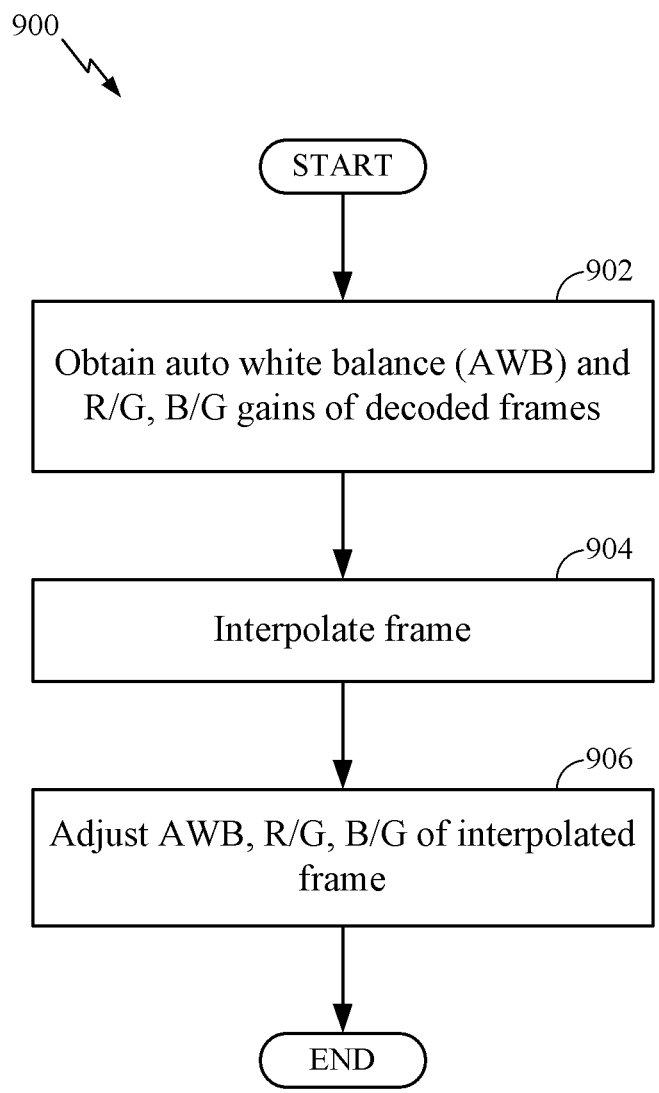
FIG. 9A illustrates a flowchart of an example frame rate up-conversion method based on auto white balance in accordance with aspects of this disclosure.
Figure 9B:
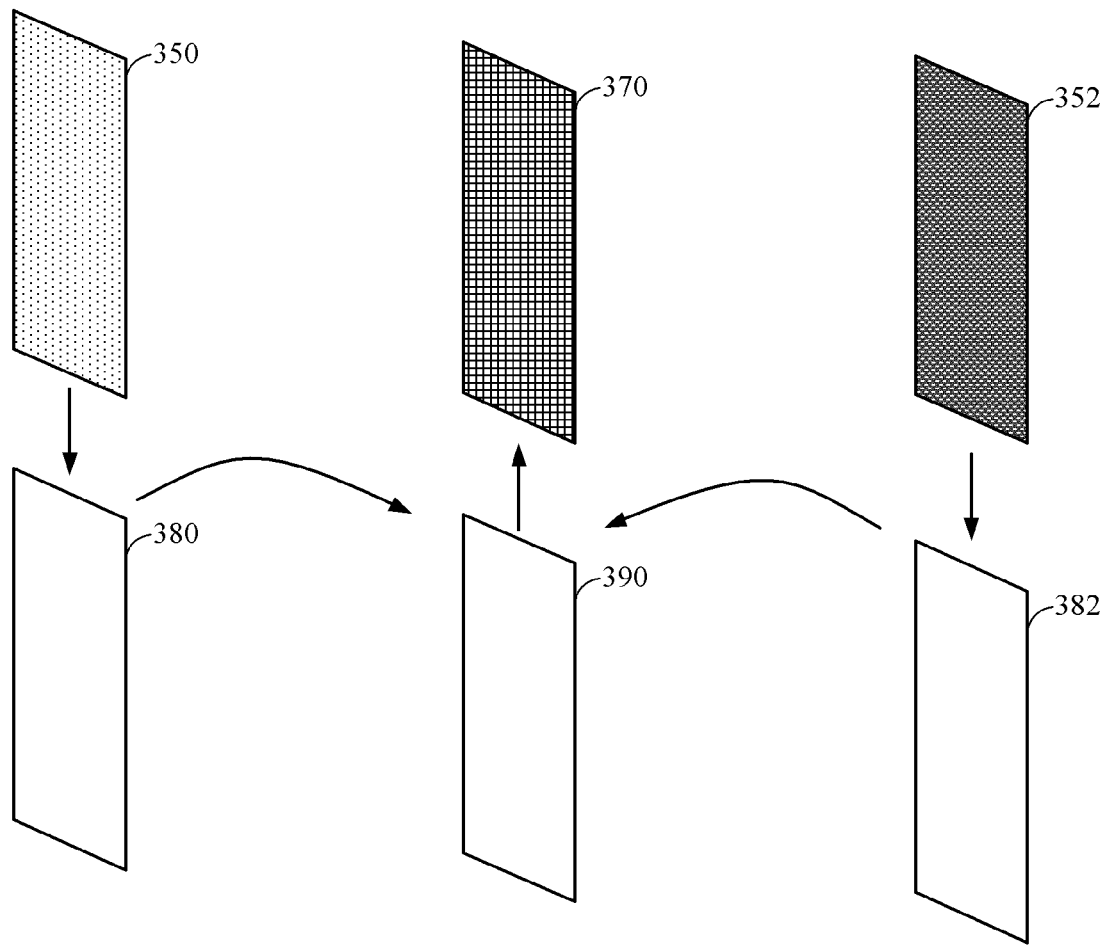
FIG. 9B illustrates example use of white balance information for frame rate up-conversion in accordance with aspects of this disclosure.

FIG. 9A illustrates a flowchart of an example frame rate up-conversion method based on auto white balance in accordance with aspects of this disclosure. FIG. 9B illustrates example use of white balance information for frame rate up-conversion in accordance with aspects of this disclosure. As illustrated in FIG. 9A, a method 900 may include obtaining the auto white balance (AWB) and R/G, B/G gains from the decoded frames at block 902. The frame rate of the video stream may be up-converted by interpolating a frame at block 904. Following the interpolation of the frame, the AWB, R/G, and B/G of the interpolated frame can be adjusted as illustrated in block 906.

With reference to FIG. 9B, the interpolated frame 370 is interpolated based on the decoded frames 350 and 352. The neighboring frames 380 and 382 are generated by converting the decoded frames to the neighboring luma domain frames 380 and 382. The motion vectors for the intermediate frame 390 which is used to generate the interpolated frame 370 are predicted in the luma domain. Following the interpolation of the interpolated frame 370, the AWB, R/G, and B/G of the interpolated frame 370 is adjusted.

According to some embodiments, the camera parameters may also include global motion information. At the image processor 66, global motion information may be detected by a motion sensor (e.g., accelerometer). For video capture devices that may not have a motion sensor, global motion information can also be obtained by some processing such as, for example, analyzing row sum and column sum, or other processing at the camera parameter determination stage.

In an example where a video capture device has a motion sensor, the motion sensor may provide some of the following information of the global motion:

Movement acceleration information in 3 dimensions ($a_x$, $a_y$, $a_z$)

Movement velocity information in 3 dimensions ($V_x$, $V_y$, $V_z$)

Movement distance information in 3 dimensions ($D_x$, $D_y$, $D_z$)

Movement rotation angle information ($\alpha, \beta, \gamma$)

Figure 10A:
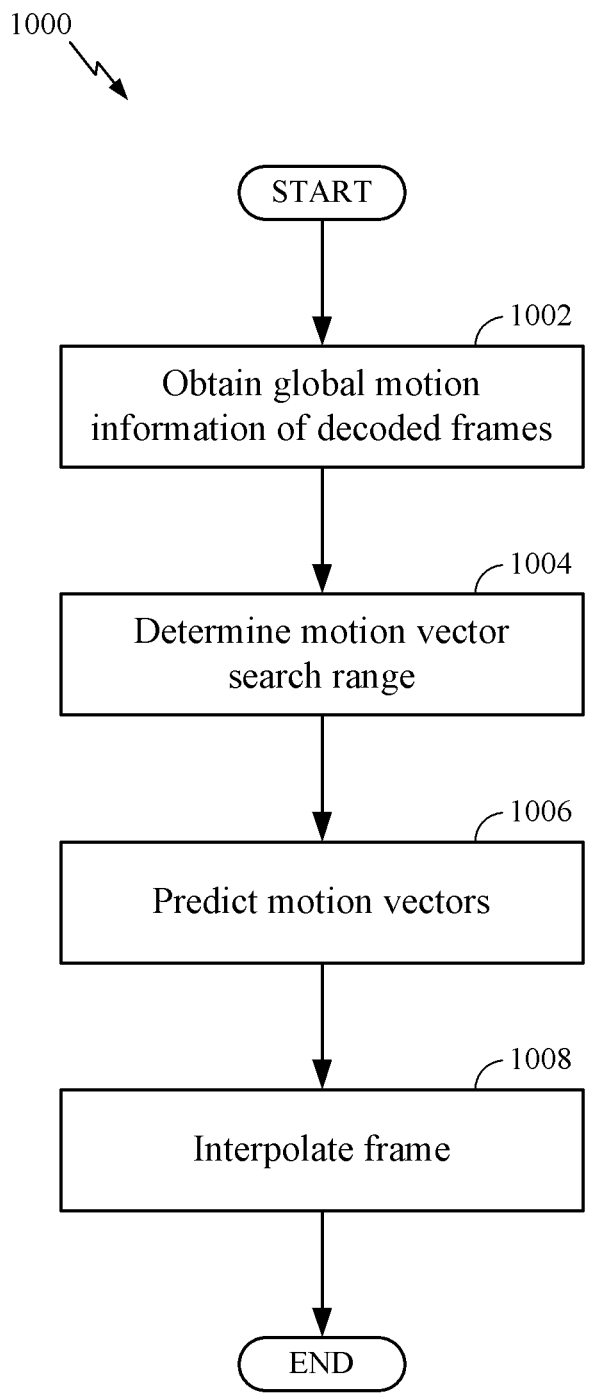
FIG. 10A illustrates a flowchart of an example frame rate up-conversion method based on motion information in accordance with aspects of this disclosure.
Figure 10B:
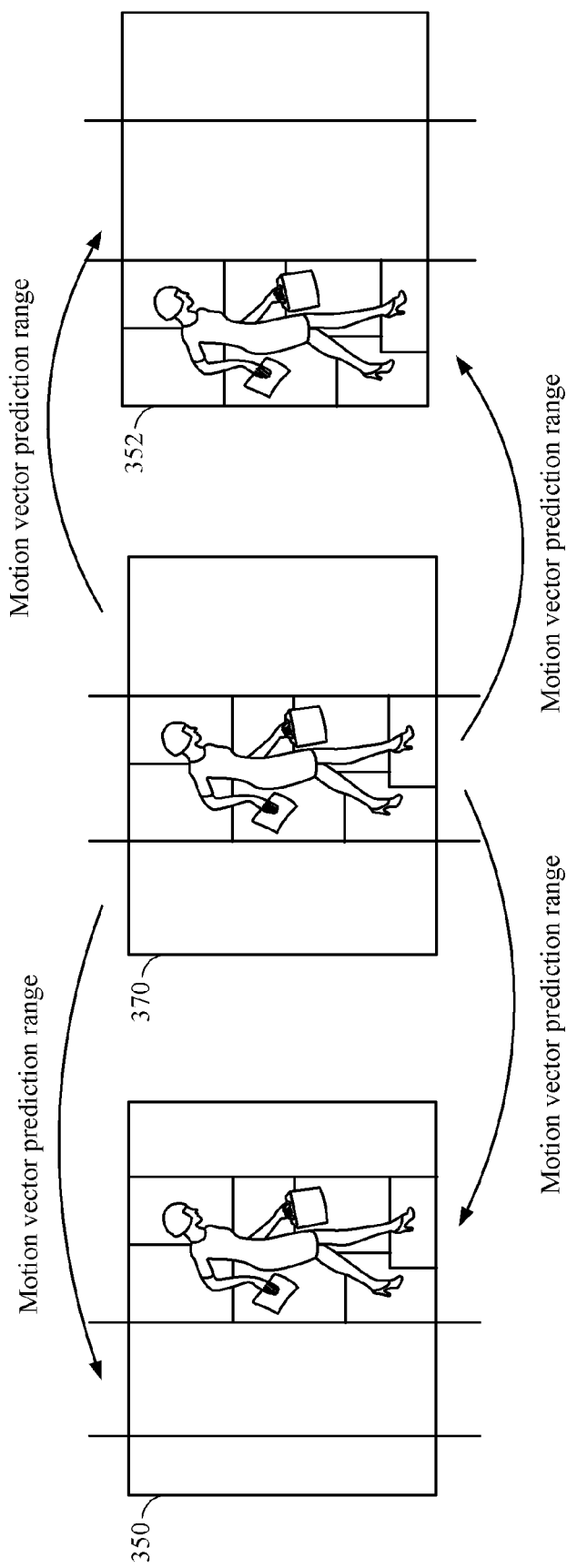
FIG. 10B illustrates example use of motion information for frame rate up-conversion in accordance with aspects of this disclosure.

The method of utilizing global motion information for frame rate up-conversion will be described with reference to FIGS. 10A and 10B. FIG. 10A illustrates a flowchart of an example frame rate up-conversion method based on motion information in accordance with aspects of this disclosure. FIG. 10B illustrates example use of motion information for frame rate up-conversion in accordance with aspects of this disclosure.

As illustrated in FIG. 10A, the method 1000 includes obtaining global motion information of the decoded frames at block 1002. A motion vector search range is determined based on the global motion information at block 1004. Motion vectors are predicted within the motion vector search range at block 1006. An interpolated frame for frame rate up-conversion is generated at block 1008 based on the predicted motion vectors.

With knowledge of the global motion information of the image capture device 60, which is transmitted to the video display device 80, the video decoding device may utilize the direction of the global motion from frame 350 to frame 352 in motion vector prediction of the inserted frame 370 as illustrated in FIG. 10B.

For example, global motion information, such as ($a_x$, $a_y$, $a_z$), ($V_x$, $V_y$, $V_z$), ($D_x$, $D_y$, $D_z$), or ($\alpha, \beta, \gamma$) is sent through metadata to the video display device 80 for assisting with frame rate up-conversion. According to one aspect of the disclosure, by knowing the global motion information, the motion vector prediction range on the reference frames may be specified. With pre-knowledge on global motion information, the motion vector search may be more efficient and more accurate, as it reduces the search for the matching block on pixels in a frame to a known location. Having prior global motion information may reduce the complexity of frame rate up-conversion algorithms by reducing the amount of search an algorithm needs to perform to find matching blocks in frames to determine motion vectors.

In the example of FIG. 10B, by knowing the horizontal global motion information ($D_x$, $D_y$, $D_z$), the motion vector prediction range can be specified to the region corresponding to the global motion information. As a result, the motion search computation is simplified and the interpolation accuracy is improved.

According to some embodiments, the camera parameters sent to the video display device 80 may also include any combination of the above described camera parameters. In addition, computations of other parameters using the received camera parameters may be sent to the video display device 80, or may be calculated by the video display device 80 based on received camera parameters in order to assist with video frame rate up-conversion.

For example, a blurry frame blur value (BV) calculation may be determined based on the camera parameters. According to some embodiments, an i-th frame's Blur Value (BVi) may be calculated based on the estimated total motion value (MV), an exposure time ($T_{exp}$) and the frame period $T_{frame}$. The frame period $T_{frame}$ may be defined as 1/frame rate of the video stream. According to some examples, $T_{frame}$ may be set equal to approximately 0.33 ms.

The total motion value MV may be calculated according to Equation 12 below:

$$MV = |MV_{device}| + |MV_{object}| \quad \text{Eq. (12)}$$

wherein $MV_{device}$ corresponds to the motion of the camera as a result of, for example, panning and hand jitter and $MV_{object}$ corresponds to motion of an object in the captured scene.

The blur value ($BV_i$) may then be calculated based on Equation 13 below:

$$BV_i = \begin{cases} 0 & \text{if} \quad MT \leq MT_0 \\ K|MV|\dfrac{T_{exp}}{T_{frame}} & \text{if} \quad MT_0 < MT < MT_1 \quad MT = |MV| \times T_{exp} \\ 1 & \text{if} \quad MT > MT \end{cases} \quad \text{Eq. (13)}$$

wherein K is normalization parameter for the blur value such that the blur value falls within the range of zero to 1, $MT_0$ corresponds to the selected lower threshold below which blur artifacts can be neglected, $MT_1$ corresponds to the selected upper threshold above which blur artifacts are high enough and can be categorized as a case in which a blur value can be approximated such that BV=1. Based on different motion estimation techniques, the threshold values can be variably selected and may be tunable by the image capture device 60.

According to some embodiments, different combinations of camera parameters may be used to assist in frame rate up-conversion. For example, in many cases, several camera adjustments during capture of video data may occur simultaneously. For example, during panning, the auto focus refocusing may also be triggered. In this situation, the AEC may start converging if the environmental brightness changes from the initial panning location to the other locations. In these combined situations, the proposed individual strategies could also be combined to assist frame rate up-conversion process.

Aspects of this disclosure may provide techniques for assisting video decoding device side frame rate up-conversion by sending metadata from image capture device. Metadata may contain the information that can be used by the device decoding device to perform frame rate up-conversion. The information may include: digital/optical zooming in/out information, auto focus refocusing information, frame blurriness information, AEC convergence information, AWB convergence information, global motion information, and the like. By using the metadata for frame rate up-conversion, the computation on motion vector interpolation may be significantly reduced and the accuracy of the prediction results may also be significantly improved.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one example, a system may comprise means capable of performing the techniques of this disclosure. The system may be a stand-alone video system or part of another system, which comprises among other functionalities a video processing system. In some examples, the video capture device, video encoding device, and video decoding device may be implemented in one or more devices.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be embodied or encoded in a computer-readable medium, such as a non-transitory computer-readable storage medium, containing instructions. Instructions embedded or encoded in a non-transitory computer-readable medium may cause one or more programmable processors, or other processors, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof In an example implementation, techniques described in this disclosure may be performed by a digital video coding hardware apparatus, whether implemented in part by hardware, firmware and/or software.

Various aspects and examples have been described. However, modifications can be made to the structure or techniques of this disclosure without departing from the scope of the following claims.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Thus, a skilled artisan will appreciate that the configurations and principles of the example implementations can be adapted for any other electronic system. The circuits employing the above described configurations can be implemented into various electronic devices or integrated circuits. Examples of the electronic devices can include, but are not limited to, consumer electronic products, parts of the consumer electronic products, electronic test equipment, healthcare monitors, etc. Further, the electronic device can include unfinished products.

What is claimed is:

1. A method for decoding data comprising:
   decoding encoded video data to obtain decoded video frame data, the encoded video data comprising encoded video frame data and embedded data, the encoded video frame data encoded at a first frame rate;
   determining a camera parameter from the embedded data; and
   up-converting the decoded video frame data to a second frame rate based on the camera parameter.

2. The method of claim 1, wherein the encoded video frame data further comprises a plurality of video frames, and wherein the embedded data comprises a plurality of camera parameters corresponding to the plurality of video frames.

3. The method of claim 2, further comprising:
   determining zooming information from at least one of the plurality of camera parameters,
   wherein up-converting the decoded video frame data to the second frame rate comprises:
      determining a zooming factor from the zooming information,
      scaling one or more of the plurality of video frames based on the zooming factor, and
      generating one or more additional video frames to up-convert the decoded video frame data by interpolating one or more of the plurality of video frames based at least in part on the scaled one or more of the plurality of video frames.

4. The method of claim 3, further comprising:
   determining a motion vector based at least in part on the scaled one or more of the plurality of video frames,
   wherein the interpolating of the one or more of the plurality of video frames is further based at least in part on the motion vector.

5. The method of claim 2, further comprising:
   determining auto-focus information and blurriness information from at least one of the plurality of camera parameters,
   wherein up-converting the decoded video frame data to the second frame rate comprises:
      determining, based at least in part on the auto-focus information, that at least one of the plurality of video frames was captured during focusing, determining, in response to the least one of the plurality of video frames being captured during focusing, whether an average blurriness level of the plurality of video frames exceeds a threshold, based on the blurriness information, and generating, in response to the average blurriness level of the plurality of video frames exceeding the threshold, one or more additional video frames to up-convert the decoded video frame data by interpolating one or more of the plurality of video frames based at least in part on an average of pixel values of the plurality of video frames.

6. The method of claim 5, wherein up-converting the decoded video frame data to the second frame rate comprises:

determining, in response to the average blurriness level of the plurality of video frames not exceeding the threshold, a length of a motion vector search range to be inversely proportional to a blurriness level of the plurality of video frames, and generating one or more additional video frames to up-convert the decoded video frame data by interpolating the plurality of video frames based on the determined motion vector search range.

7. The method of claim 2, further comprising:

determining brightness information from at least one of the plurality of camera parameters, wherein up-converting the decoded video frame data to the second frame rate comprises:

determining, based on the brightness information, a frame luma of a first video frame and a second video frame from the plurality of video frames, respectively, generating a first reference frame based on the first video frame and the frame luma of the first video frame, generating a second reference frame based on the second video frame and the frame luma of the first video frame, determining a motion vector based at least in part on the first and second reference frame, and generating one or more additional video frames to up-convert the decoded video frame data by interpolating one or more of the plurality of video frames based at least in part on the determined motion vector and the first and second reference frames.

8. The method of claim 7, further comprising adjusting a frame luma of the one or more additional video frames based at least in part on the frame luma of the first and second video frames, wherein the adjusted frame luma of the one or more additional video frames is between the frame luma of the first and second video frames.

9. The method of claim 2, further comprising:

determining auto-white balance (AWB) convergence status information and color gain information from at least one of the plurality of camera parameters, wherein up-converting the decoded video frame data to the second frame rate comprises:

generating one or more additional video frames to up-convert the decoded video frame data by interpolating one or more of the plurality of video frames, and adjusting a color gain of the one or more additional video frames based on the AWB convergence status information and the color gain information.

10. The method of claim 2, further comprising:

determining global motion information from at least one of the plurality of camera parameters, wherein up-converting the decoded video frame data to the second frame rate comprises:

determining a motion vector search range based at least in part on the global motion information, determining motion vectors based on the motion vector search range, and generating one or more additional video frames to up-convert the decoded video frame data by interpolating one or more of the plurality of video frames based at least in part on the determined motion vector.

11. The method of claim 1, further comprising displaying the up-converted decoded video frame data at the second frame rate on an electronic display.

12. The method of claim 1, wherein the camera parameter used for up-converting the decoded video frame data to the second frame rate includes one or more of a zoom factor, an auto focus status, lens position information, frame luma information, an auto exposure (AE) convergence status, an automatic white balance (AWB) convergence status, global motion information, and frame blurriness information.

13. An apparatus for decoding data comprising:

a decoder configured to:
 decode encoded video data to obtain decoded video frame data, the encoded video data comprising encoded video frame data and embedded data, the encoded video frame data encoded at a first frame rate; and
 determine a camera parameter from the embedded data; and a processor configured to up-convert the decoded video frame data to a second frame rate based on the camera parameter.

14. The apparatus of claim 13, wherein the decoder is further configured to:

decode the encoded video data to obtain a plurality of video frames; and determine a plurality of camera parameters corresponding to the plurality of video frames from the embedded data.

15. The apparatus of claim 14, wherein the processor is further configured to:

determine zooming information from at least one of the plurality of camera parameters;

determine a zooming factor from the zooming information;

scale one or more of the plurality of video frames based on the zooming factor; and generate one or more additional video frames to up-convert the decoded video frame data to the second frame rate by interpolating one or more of the plurality of video frames based at least in part on the scaled one or more of the plurality of video frames.

16. The apparatus of claim 15, wherein the processor is further configured to:

determine a motion vector based at least in part on the scaled one or more of the plurality of video frames, wherein the interpolating of the one or more of the plurality of video frames is further based at least in part on the motion vector.

17. The apparatus of claim 14, wherein the processor is further configured to:

determine auto-focus information and blurriness information from at least one of the plurality of camera parameters;

determine, based at least in part on the auto-focus information, that at least one of the plurality of video frames was captured during focusing;

determine, in response to the least one of the plurality of video frames being captured during focusing, whether an average blurriness level of the plurality of video frames exceeds a threshold, based on the blurriness information; and generate, in response to the average blurriness level of the plurality of video frames exceeding the threshold, one or more additional video frames to up-convert the decoded video frame data to the second frame rate by interpolating one or more of the plurality of video frames based at least in part on an average of pixel values of the plurality of video frames.

18. The apparatus of claim 17, wherein the processor is further configured to:

determine in response to the average blurriness level of the plurality of video frames not exceeding the threshold, a length of a motion vector search range to be inversely proportional to a blurriness level of the plurality of video frames; and generate one or more additional video frames to up-convert the decoded video frame data by interpolating the plurality of video frames based on the determined motion vector search range.

19. The apparatus of claim 14, wherein the processor is further configured to:

determine brightness information from at least one of the plurality of camera parameters;

determine, based on the brightness information, a frame luma of a first video frame and a second video frame from the plurality of video frames, respectively;

generate a first reference frame based on the first video frame and the frame luma of the first video frame;

generate a second reference frame based on the second video frame and the frame luma of the first video frame;

determine a motion vector based at least in part on the first and second reference frame; and generate one or more additional video frames to up-convert the decoded video frame data to the second frame rate by interpolating one or more of the plurality of video frames based at least in part on the determined motion vector and the first and second reference frames.

20. The apparatus of claim 19, wherein the processor is further configured to adjust a frame luma of the one or more additional video frames based at least in part on the frame luma of the first and second video frames, wherein the adjusted frame luma of the one or more additional video frames is between the frame luma of the first and second video frames.

21. The apparatus of claim 14, wherein the processor is further configured to:

determine auto-white balance (AWB) convergence status information and color gain information from at least one of the plurality of camera parameters; and generate one or more additional video frames to up-convert the decoded video frame data to the second frame rate by interpolating one or more of the plurality of video frames; and adjust a color gain of the one or more additional video frames based on the AWB convergence status information and the color gain information.

22. The apparatus of claim 14, wherein the processor is further configured to:

determine global motion information from at least one of the plurality of camera parameters; and determine a motion vector search range based at least in part on the global motion information;

determine motion vectors based on the motion vector search range; and generate one or more additional video frames to up-convert the decoded video frame data to the second frame rate by interpolating one or more of the plurality of video frames based at least in part on the determined motion vector.

23. The apparatus of claim 13, wherein the processor is further configured to display the up-converted decoded video frame data at the second frame rate on an electronic display.

24. The apparatus of claim 13, wherein the camera parameter used for up-converting the decoded video frame data to the second frame rate includes one or more of a zoom factor, an auto focus status, lens position information, frame luma information, an auto exposure (AE) convergence status, an automatic white balance (AWB) convergence status, global motion information, and frame blurriness information.

25. A non-transitory computer-readable medium having stored thereon code that when executed performs a method for decoding data comprising:

decoding encoded video data to obtain decoded video frame data, the encoded video data comprising encoded video frame data and embedded data, the encoded video frame data encoded at a first frame rate;

determining a camera parameter from the embedded data; and up-converting the decoded video frame data to a second frame rate based on the camera parameter.

26. The non-transitory computer-readable medium of claim 25, wherein the encoded video frame data further comprises a plurality of video frames, and wherein the embedded data comprises a plurality of camera parameters corresponding to the plurality of video frames.

27. The non-transitory computer-readable medium of claim 25, wherein the method further comprises displaying the up-converted decoded video frame data at the second frame rate on an electronic display.

28. The non-transitory computer-readable medium of claim 25, wherein the camera parameter used for up-converting the decoded video frame data to the second frame rate includes one or more of a zoom factor, an auto focus status, lens position information, frame luma information, an auto exposure (AE) convergence status, an automatic white balance (AWB) convergence status, global motion information, and frame blurriness information.

* * * * *